June 24, 1941.   L. SPINO   2,246,641
TOMATO JUICING DEVICE
Filed Aug. 2, 1939
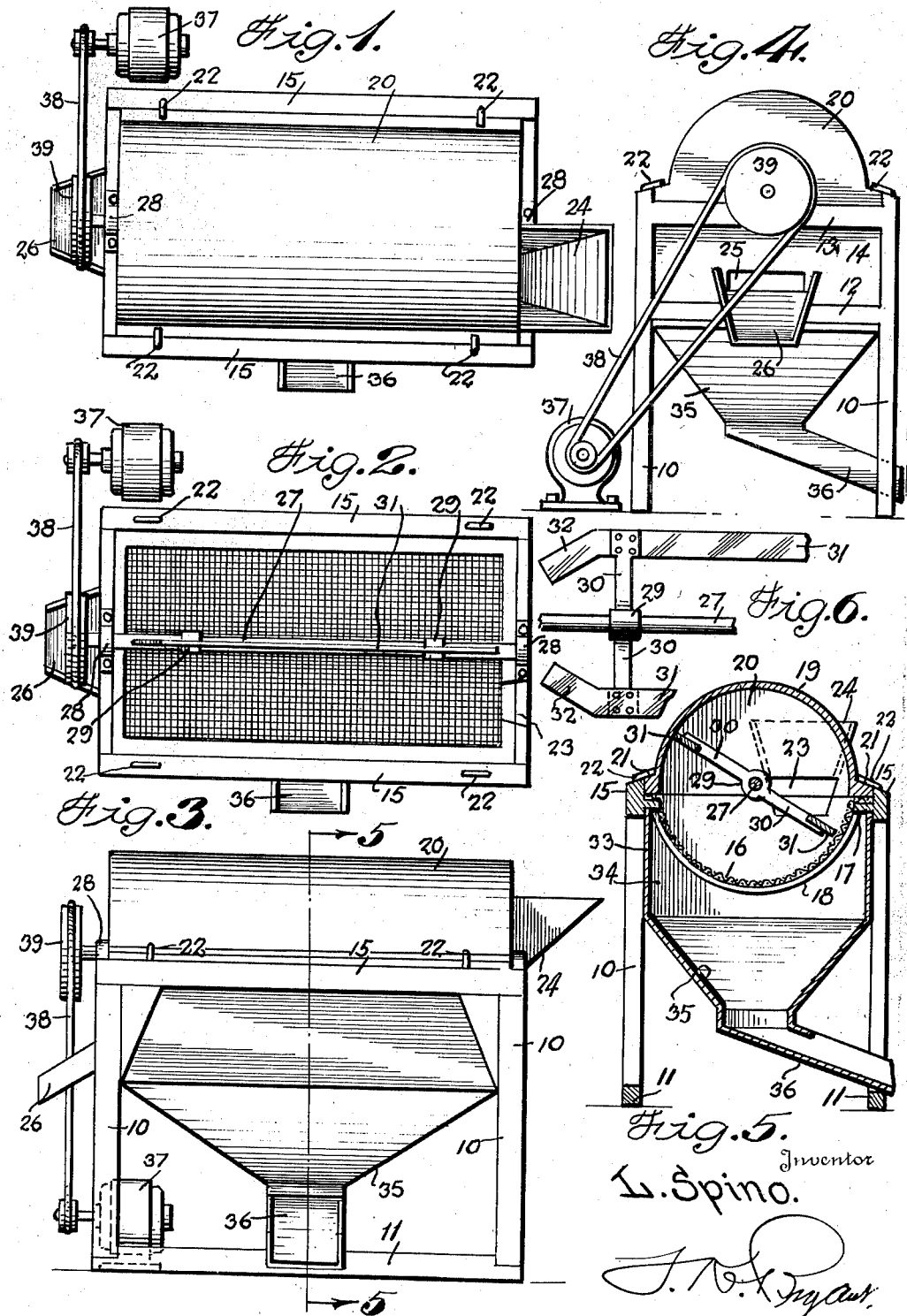
Inventor
L. Spino.
Attorney.

Patented June 24, 1941

2,246,641

UNITED STATES PATENT OFFICE 2,246,641

TOMATO JUICING DEVICE

Leon Spino, Clyde, N. Y.

Application August 2, 1939, Serial No. 287,997

1 Claim. (Cl. 146—174)

This invention relates to certain new and useful improvements in tomato juicing device.

The primary object of the invention is to provide a tomato juicing device wherein the juice is expressed from tomatoes and strained for the making of tomato cocktails, catchup and the like.

A further object of the invention is to provide a tomato juicer of the foregoing character wherein a frame structure supports a cylindrical casing having a foraminous lower side and a removable closed upper side with a panel or blade rotatably mounted in the casing and wiping over the screened bottom side thereof for expressing juice from tomatoes that is discharged from the casing with the seeds and skin removed and discharged at one end of the casing, it being noted that the device is also adaptable for expressing juice from cooked fruit in the making of jellies as well as producing pulp from cooked pumpkins, and apples.

With the above and other objects in view that will become apparent as the nature of the invention is better understood, the same consists in the novel form, combination and arrangement of parts hereinafter more fully described, shown in the accompanying drawing and claimed.

In the drawing:

Figure 1 is a top plan view of a tomato juicing device constructed in accordance with the present invention;

Figure 2 is a top plan view with the cover of the drainer casing removed to show the screened bottom side of the casing and the paddle or beater blade therein;

Figure 3 is a side elevational view showing a seed hopper at one end of the casing, a lateral discharge for the expressed juice and a discharge chute at the other end of the casing for seeds, skins and the like;

Figure 4 is an end elevational view;

Figure 5 is a vertical cross-sectional view taken on line 5—5 of Figure 3, showing the casing having a screened bottom wall and a removable top closure wall with the beater blade therein; and Figure 6 is a fragmentary plan view of the beater blade showing the beater arms bent inwardly at corresponding ends for directing the seeds, skins and the like toward the discharge chute of the casing.

The tomato juicing device is primarily intended for home use and includes a skeleton frame structure of generally rectangular formation with vertical corner legs 10, the lower ends of the legs at each side of the frame structure being attached to a longitudinally extending foot rail 11. The legs 10 at each end of the frame structure are connected by a cross-bar 12 intermediate the upper and lower ends of said legs and the upper ends of said legs are connected by a cross bar 12 intermediate the upper and lower ends of said legs and the upper ends of said legs are connected by a cross bar 13 as shown in Figure 4. Each end of the frame structure is provided with a closed end wall section 14 between the cross bars 12 and 13 and the upper ends of the legs 10. The upper ends of the legs 10 at each side of the frame structure are connected by a horizontal head rail 15.

A tomato receiving casing or receptacle of cylindrical formation is mounted in the upper end of the frame structure between the upper end rails 13 and the side head rails 15 and as shown more clearly in Figures 2 and 5, comprises a lower screened section 16 supported at its opposite side edges on inwardly directed ledges 17 carried by the side head rails 15, arcuate wires 18 being secured at their ends to said ledges 17 and providing a support for the substantially semi-circular screen section 17 for holding the same in position against sagging movement. The upper section 19 of the tomato receiving receptacle is of upwardly arched formation and being preferably constructed of sheet metal, has end walls that are seated on the upper end rails 13 between the legs 10 while outwardly directed side flanges 21 carried by the cover section 19 rest upon the ledges 17 as shown in Figure 5, the cover section 19 being removably retained in position by the overhanging hinged cleats 22 carried by the upper sides of the side head rails 15. As shown in Figure 5, an opening 23 is formed in one end wall 20 of the receptacle cover and a hopper 24 carried by said end wall discharges the tomatoes through the opening 23 into the receptacle. An opening 25 is formed in the end wall section 14 of the frame structure opposite the hopper 24 in the plane of the lower side of the screen bottom 16 of the receptacle and a chute 26 is associated with said opening 25 for the discharge of seeds, skins and the like.

The device for expressing juice from the tomatoes comprises a rotatable paddle or beater having a shaft 26 journaled longitudinally of the tomato receiving receptacle and axially thereof with said shaft mounted at its ends in bearings 28 on the upper sides of the upper end bars 13. The shaft 27 within the receptacle and adjacent opposite ends thereof has a block 29 fixed thereto from which a pair of diametrically opposite arms 30 project, the outer ends of the arms 30 of each pair carrying an elongated blade 31 that moves in substantially wiping contact with the screened bottom wall 16 and the closed top wall 19 of the receptacle as shown in Figure 5. The ends of the blades 31 adjacent the discharge end of the receptacle are bent or directed inwardly as at 32 in the plane of said blades 31 for directing seeds, skins and the like toward the discharge opening 25 in the end wall section 14. It is to be understood that the bent ends 32 may be angularly bent out of the plane of the blades 31 and accomplish the same purpose.

A juice collection chute is supported within the skeleton frame structure below the tomato receiving receptacle and has an upper section of generally rectangular formation comprising side and end walls 33 and 34 respectively, the lower portion thereof being of frusto-conical formation as shown at 35 with the lower end thereof terminating in an inclined chute 36 with the discharge end thereof supported on a foot rail 11.

The operating means for the juice expressing device preferably comprises an electric motor 37 having a belt connection 38 with a pulley 39 fixed to the shaft 27 projecting from the frame structure above the discharge chute 26.

In the use of the device, crushed tomatoes are delivered to the hopper 24 for passage into the receptacle and upon rotation of the juice expressing device, the blades 31 rub the tomatoes over the screen bottom 16 with the juice delivered into the collection chamber therebeneath for discharge by way of the chute 36, the seeds, skins and the like being carried along the receptacle and discharged to the end outlet opening 25 and onto the chute 26 for collection in a suitable receptacle. The device is also capable of juicing in extracting juice from berries for the making of jelly and will also be found to be highly serviceable in the making of apple sauce by pressing the pulp of cooked apples through the screen 16.

From the above detailed description of the invention, it is believed that the construction and operation thereof will at once be apparent and while there is herein shown and described the preferred embodiment of the invention, it is nevertheless to be understood that minor changes may be made therein without departing from the spirit and scope of the invention as claimed.

I claim:

In a juicer of the character described, a frame structure, a stationary cylindrical receptacle carried thereby and having a screen bottom and an impervious top cover wall, a beater rotatably mounted in the receptacle, feed and refuse discharge means for the receptacle, a juice collection chamber and chute beneath the receptacle, side ledges on the frame structure for the support of opposite side edges of the screen bottom and arcuate wires secured at their ends to said ledges with the screen bottom resting on said wires and readily removable therefrom, the beater including a shaft journalled longitudinally and axially of the receptacle, radial arms carried by the shaft and longitudinally extending blades carried by the outer ends of the arms movable in wiping contact with the screen bottom, the ends of the blades adjacent the refuse discharge means being angularly bent for directing the refuse into the discharge means.

LEON SPINO.